United States Patent
Capron et al.

(10) Patent No.: US 12,091,178 B2
(45) Date of Patent: Sep. 17, 2024

(54) AIRCRAFT ENGINE WITH STATOR HAVING VARYING GEOMETRY

(71) Applicant: PRATT & WHITNEY CANADA CORP., Longueuil (CA)

(72) Inventors: Alexandre Capron, Toronto (CA); Karan Anand, Mississauga (CA); Tammy Yam, Richmond Hill (CA); Ali Azmi, Pickering (CA); Sylvain Claude, Saint-Lambert (CA); Krishna Prasad Balike, Brampton (CA); Prakul Mittal, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/804,570

(22) Filed: May 30, 2022

(65) Prior Publication Data
US 2023/0382539 A1  Nov. 30, 2023

(51) Int. Cl.
 *F01D 9/04* (2006.01)
 *B64D 27/10* (2006.01)
 *F04D 29/54* (2006.01)

(52) U.S. Cl.
 CPC ............. *B64D 27/10* (2013.01); *F01D 9/041* (2013.01); *F04D 29/544* (2013.01)

(58) Field of Classification Search
 CPC ........ F01D 9/041; F01D 5/142; F04D 29/542; F04D 29/544; F04D 29/666; F05D 2240/121; F05D 2260/961
 See application file for complete search history.

(56) References Cited

U.S. PATENT DOCUMENTS

| | | | |
|---|---|---|---|
| 2,798,661 A | * | 7/1957 | Willenbrock, Jr. ....... F02C 7/04 415/209.1 |
| 3,830,058 A | | 8/1974 | Ainsworth |

(Continued)

FOREIGN PATENT DOCUMENTS

| | | |
|---|---|---|
| EP | 0839259 | 3/1999 |
| EP | 2861827 | 9/2018 |

(Continued)

OTHER PUBLICATIONS

European Search Report issued on Nov. 7, 2023 for corresponding application No. 23176107.3.

*Primary Examiner* — Brian P Wolcott
*Assistant Examiner* — Jesse M Prager
(74) *Attorney, Agent, or Firm* — NORTON ROSE FULBRIGHT CANADA LLP

(57) ABSTRACT

An aircraft engine, has: an upstream stator having upstream stator vanes distributed about a central axis; and a downstream stator having downstream stator vanes distributed about the central axis, the downstream stator located downstream of the upstream stator, a number of the upstream stator vanes different than a number of the downstream stator vanes, the downstream stator vanes including: a first vane, a major portion of a leading edge of the first vane circumferentially overlapped by one of the upstream stator vanes; and a second vane differing from the first vane by a geometric parameter, the geometric parameter causing the second vane to have one or more of: a stiffness greater than that of the first vane, and a major portion of a leading edge of the second vane circumferentially overlapped by another one of the upstream stator vanes.

11 Claims, 8 Drawing Sheets

(56) References Cited

U.S. PATENT DOCUMENTS

| | | |
|---|---|---|
| 4,791,783 A | 12/1988 | Neitzel |
| 5,152,661 A | 10/1992 | Sheets |
| 5,740,674 A | 4/1998 | Beutin et al. |
| 5,984,631 A | 11/1999 | Tolgos |
| 6,139,259 A * | 10/2000 | Ho ................... F04D 29/684 |
| | | 415/208.1 |
| 7,743,497 B2 | 6/2010 | Gautreau et al. |
| 8,087,253 B2 | 1/2012 | Ning et al. |
| 8,162,603 B2 | 4/2012 | Schilling |
| 9,482,237 B1 | 11/2016 | Pesteil et al. |
| 9,605,540 B2 | 3/2017 | Lin et al. |
| 9,650,915 B2 | 5/2017 | Calza et al. |
| 9,810,082 B2 | 11/2017 | Calza |
| 9,845,692 B2 | 12/2017 | Jamison |
| 9,909,434 B2 * | 3/2018 | Tsifourdaris ............ F01D 9/04 |
| 10,094,223 B2 * | 10/2018 | Yu ..................... B23P 15/006 |
| 10,400,606 B2 | 9/2019 | Roche |
| 10,526,905 B2 | 1/2020 | Estes et al. |
| 10,808,543 B2 | 10/2020 | Grelotti et al. |
| 10,895,268 B2 | 1/2021 | Taguchi |
| 11,073,021 B2 | 7/2021 | Roche |
| 11,580,633 B2 | 2/2023 | De Agostini et al. |
| 2010/0196147 A1 | 8/2010 | Schilling |
| 2012/0082553 A1 | 4/2012 | Eleftheriou et al. |
| 2012/0328432 A1 * | 12/2012 | Ramakrishnan ...... F04D 29/544 |
| | | 416/1 |
| 2014/0083103 A1 | 3/2014 | Gregg et al. |
| 2014/0112769 A1 | 4/2014 | Schoenenborn |
| 2014/0212284 A1 | 7/2014 | Jamison et al. |
| 2015/0198047 A1 | 7/2015 | Roche |
| 2015/0227677 A1 | 8/2015 | Sharma et al. |
| 2016/0097281 A1 | 4/2016 | Hanrahan |
| 2016/0146040 A1 | 5/2016 | Simpson et al. |
| 2016/0230584 A1 | 8/2016 | Grover |
| 2017/0114795 A1 | 4/2017 | Englebert |
| 2017/0114802 A1 | 4/2017 | Passrucker et al. |
| 2018/0156235 A1 | 6/2018 | Li et al. |
| 2018/0283189 A1 | 10/2018 | Estes et al. |
| 2020/0063755 A1 | 2/2020 | Taguchi |
| 2020/0123906 A1 | 4/2020 | Roche |
| 2020/0291862 A1 | 9/2020 | Bousfield et al. |
| 2022/0162953 A1 | 5/2022 | Jones et al. |
| 2022/0172336 A1 | 6/2022 | De Agostini et al. |

FOREIGN PATENT DOCUMENTS

| | | |
|---|---|---|
| EP | 3940200 | 1/2022 |
| GB | 2046849 A * | 11/1980 ............ F01D 5/142 |

* cited by examiner

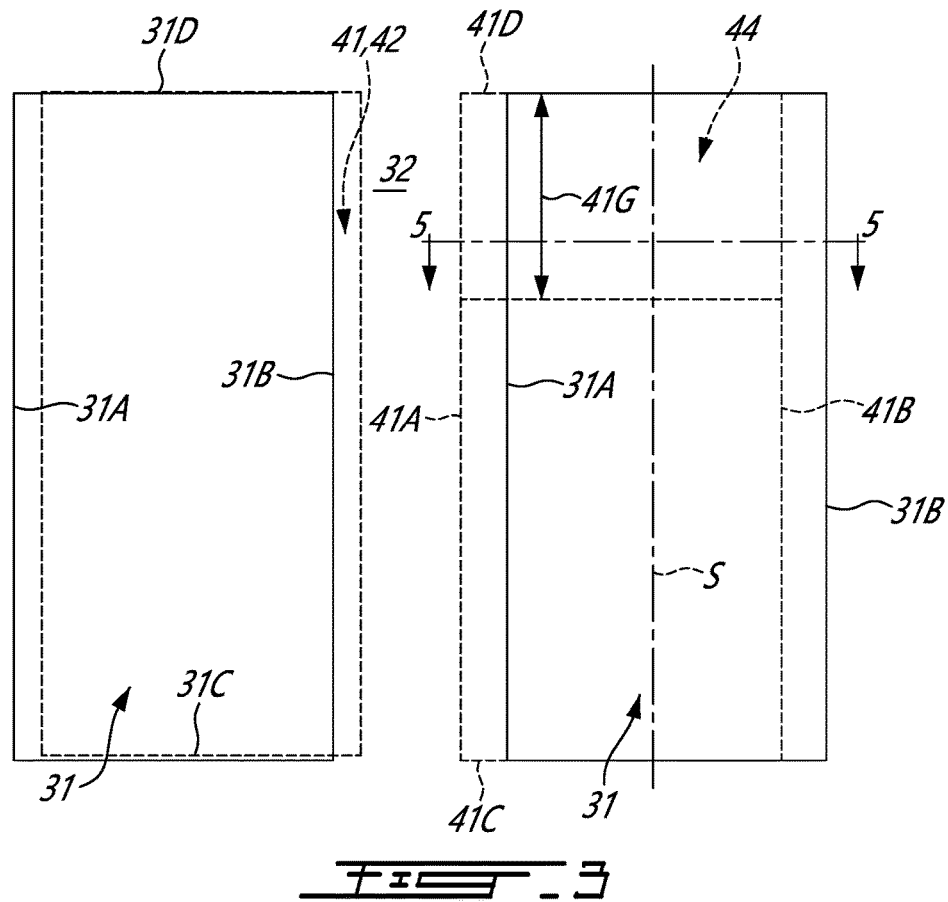
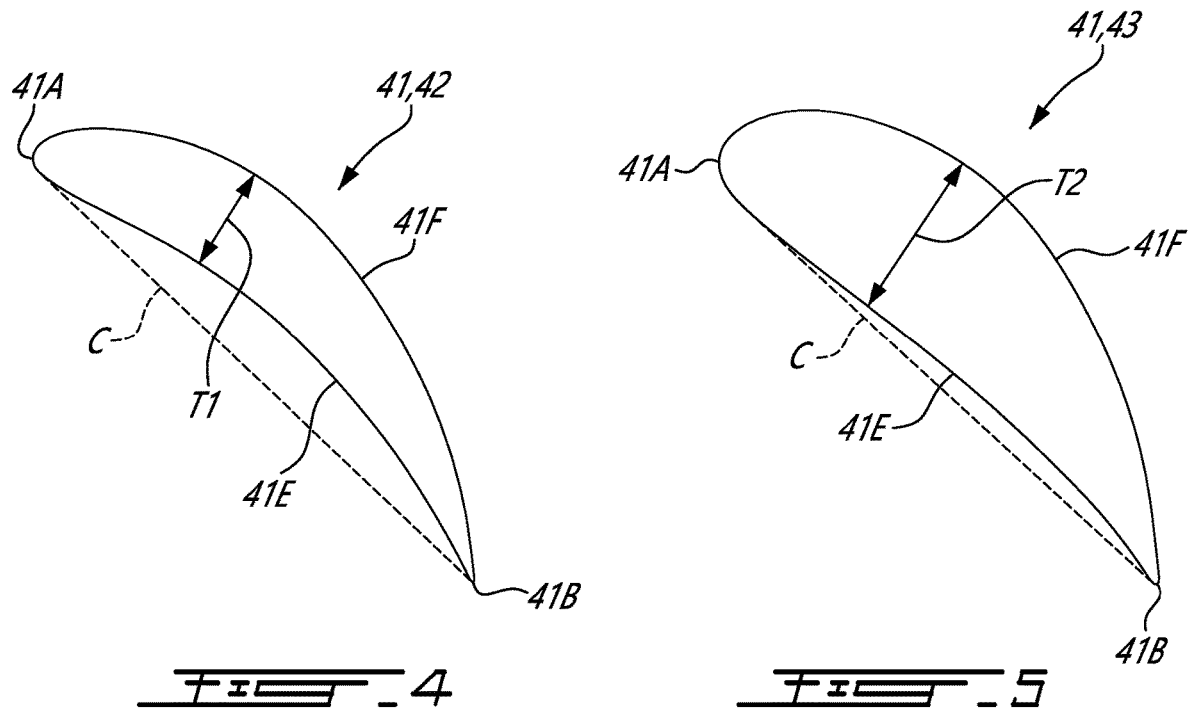

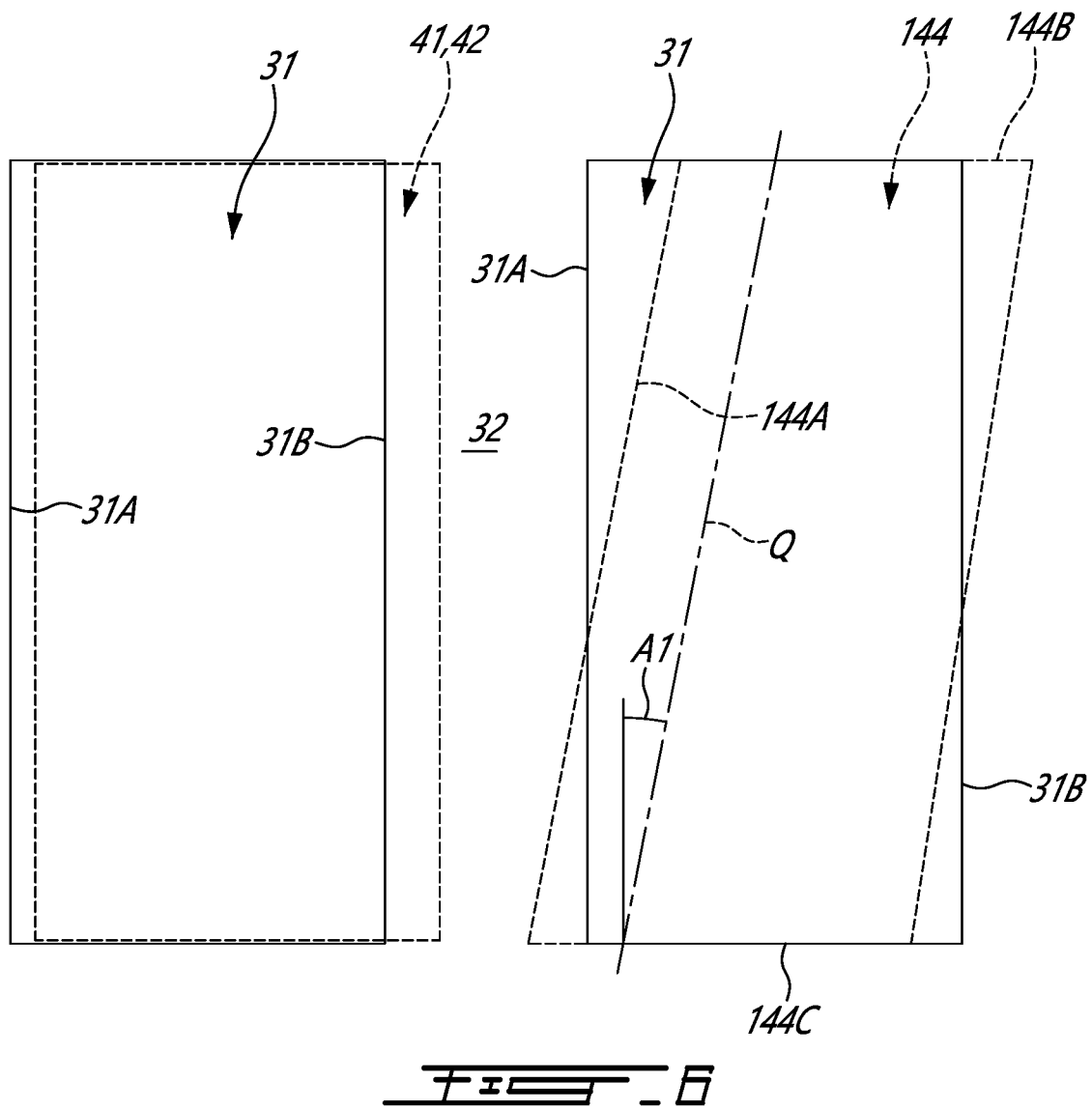

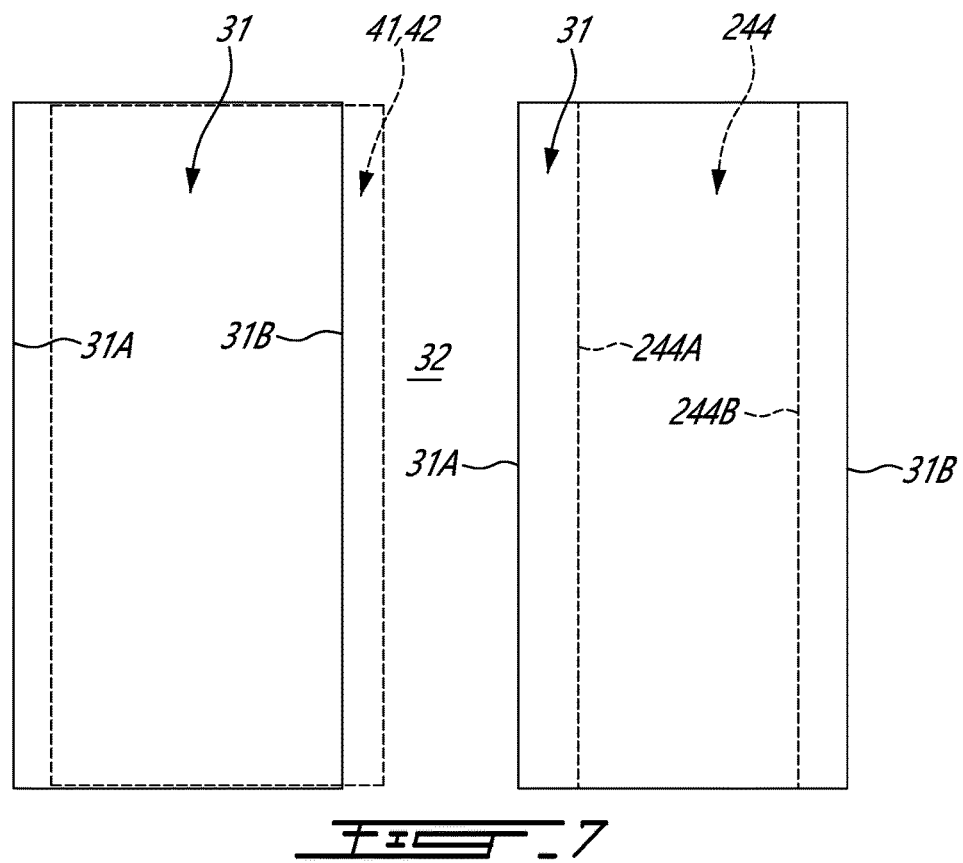
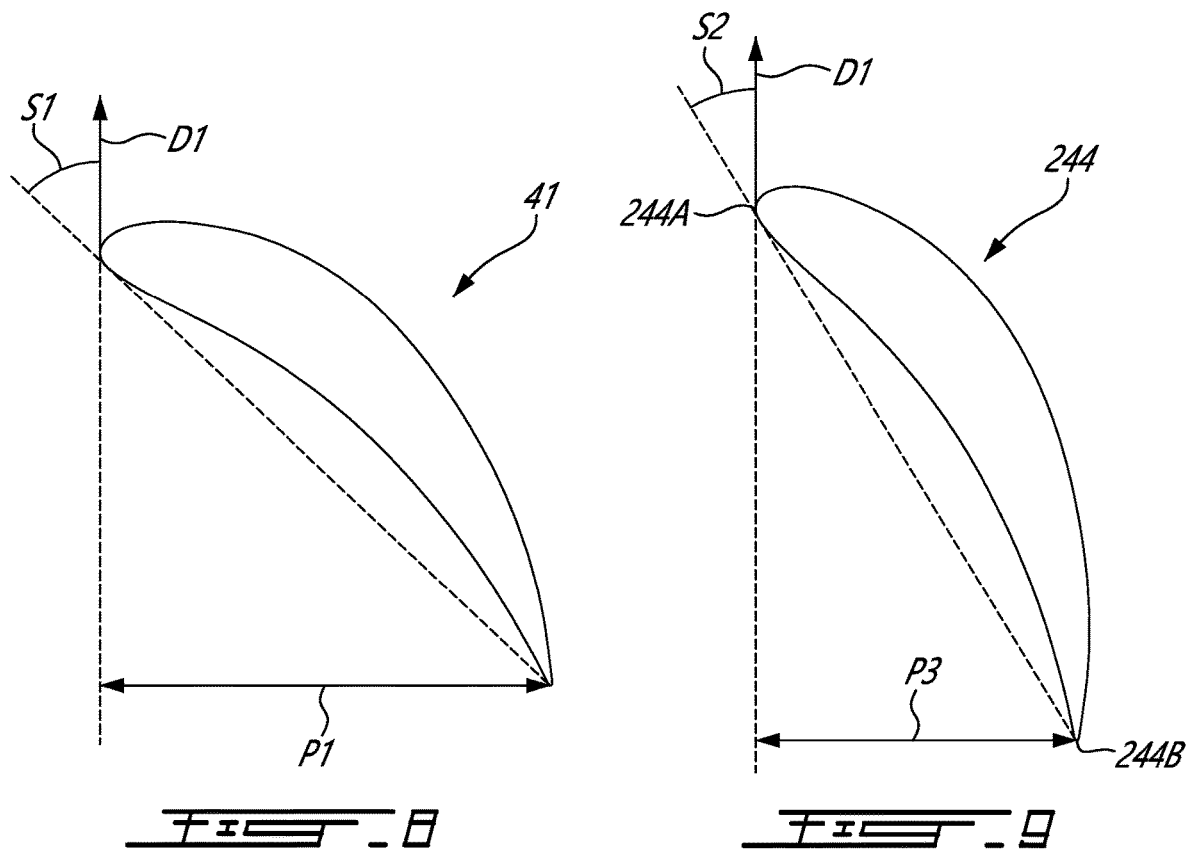

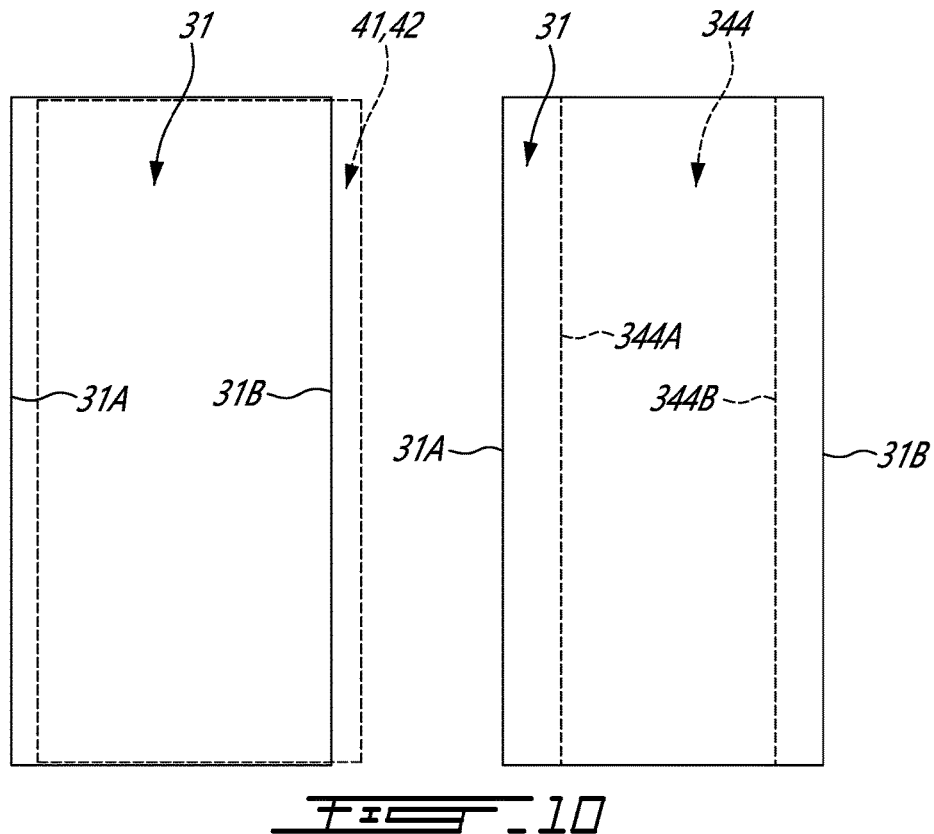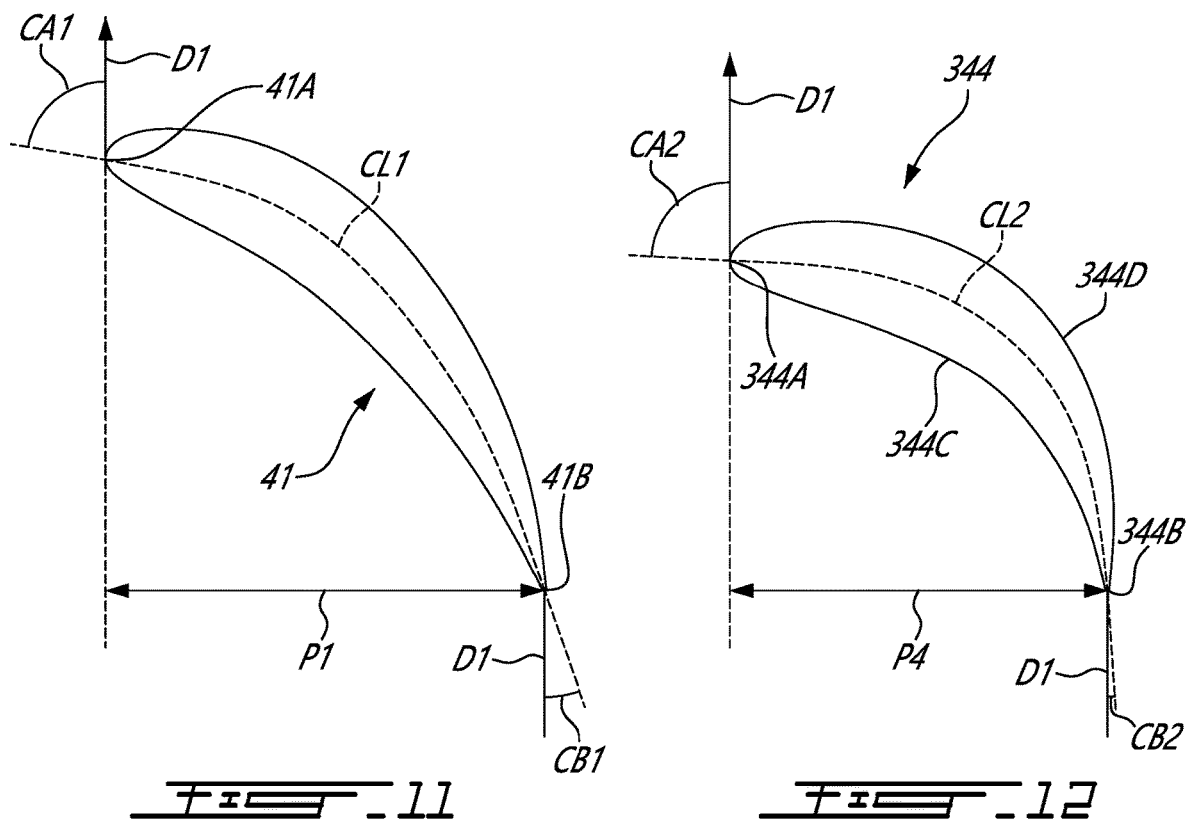

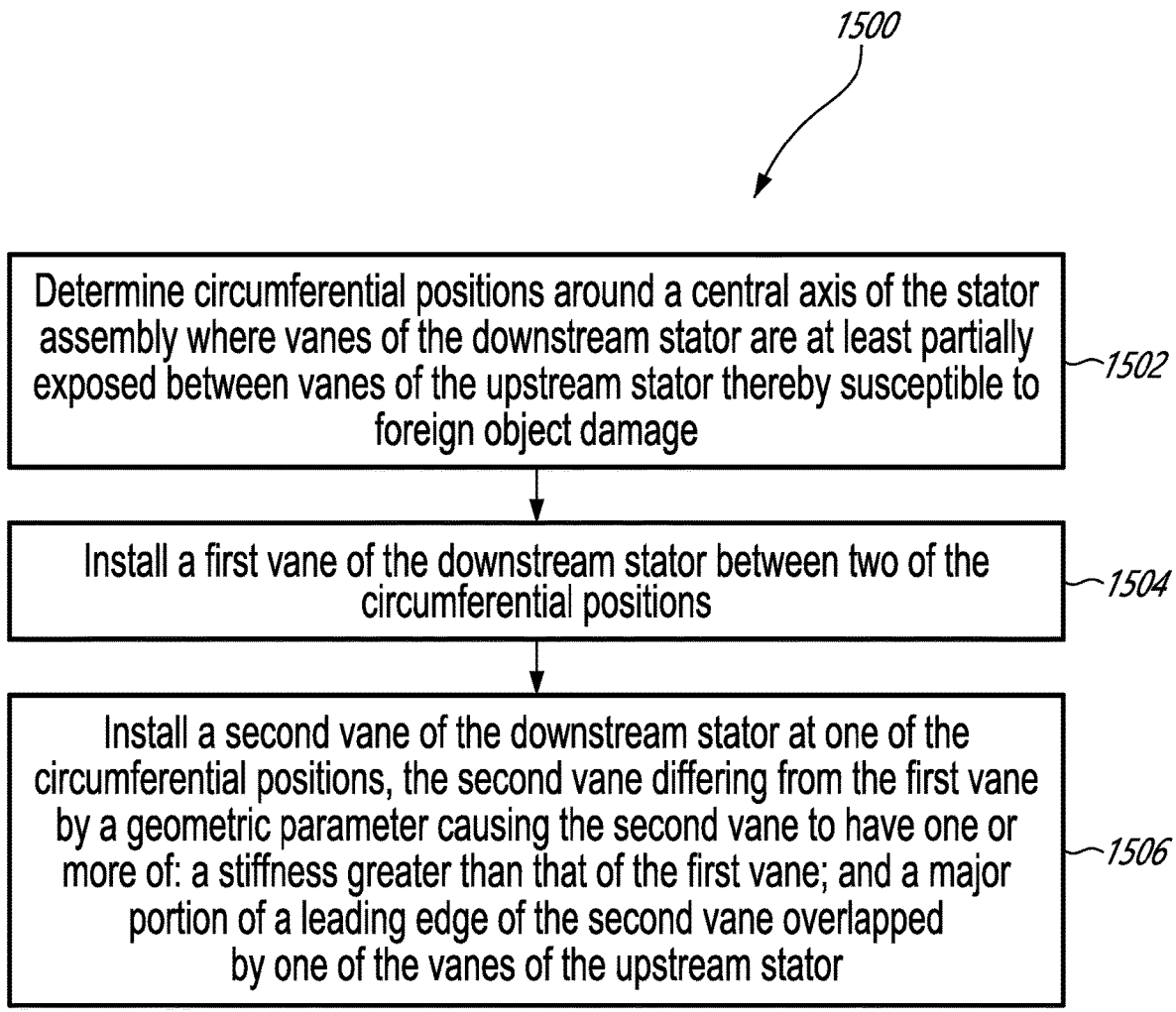

AIRCRAFT ENGINE WITH STATOR HAVING VARYING GEOMETRY

TECHNICAL FIELD

The present disclosure relates generally to aircraft engines and, more particularly, to systems and methods used to protect airfoils of such engines from foreign object damage.

BACKGROUND

In some operating conditions, aircraft engines, such as turbofan engines, may be subjected to foreign object damage (FOD). FOD may occur when a foreign object (e.g., ice) is ingested by the engine and damages an airfoil of a rotor or a stator. The damaged airfoil is typically impacted at its leading edge. This may result in performance loss, imbalance, vibrations, and so on. Improvements are therefore sought.

SUMMARY

In one aspect, there is provided an aircraft engine, comprising: an upstream stator having upstream stator vanes circumferentially distributed about a central axis; and a downstream stator having downstream stator vanes circumferentially distributed about the central axis, the downstream stator located downstream of the upstream stator relative to an airflow flowing within a core gaspath of the aircraft engine, a number of the upstream stator vanes different than a number of the downstream stator vanes, the downstream stator vanes including: a first vane, a major portion of a leading edge of the first vane circumferentially overlapped by one of the upstream stator vanes; and a second vane differing from the first vane by a geometric parameter, the geometric parameter causing the second vane to have one or more of: a stiffness greater than that of the first vane, and a major portion of a leading edge of the second vane circumferentially overlapped by another one of the upstream stator vanes.

The aircraft engine may include any of the following features, in any combinations.

In some embodiments, the major portion of the leading edge of the second vane includes at least 50% of a span of the second vane.

In some embodiments, the major portion is a radially-outer portion of the second vane.

In some embodiments, the stiffness of the second vane is greater than that of the first vanes.

In some embodiments, a thickness distribution of the second vane is different that that of the first vanes.

In some embodiments, a leading edge thickness of the second vane is greater than that of the first vane.

In some embodiments, the geometric parameter is a sweep angle defined as an angle between a quarter chord line of the second vane and a radial direction relative to the central axis, the sweep angle of the second vane different than that of the first vane such that the major portion of the leading edge of the second vane is circumferentially overlapped by the other one of the upstream stator vanes.

In some embodiments, the geometric parameter is a stagger defined as an angle between an axial direction relative to the central axis and a line connecting a leading edge and a trailing edge of the second vane, the stagger of the second vane different than that of the first vane such that the major portion of the leading edge of the second vane is circumferentially overlapped by the other one of the upstream stator vanes.

In some embodiments, the geometric parameter is a camber defined as a difference between a first angle defined between an axial direction relative to the central axis and a camber line at a leading edge of the second vane and a second angle defined between the axial direction and the camber line at a trailing edge of the second vane, the camber of the second vane different than that of the first vane such that the major portion of the leading edge of the second vane is circumferentially overlapped by the other one of the upstream stator vanes.

In some embodiments, the geometric parameter is a curvature of a spanwise axis of the second vane, the curvature of the second vane different that that of the first vane such that the major portion of the leading edge of the second vane is circumferentially overlapped by the other one of the upstream stator vanes.

In some embodiments, the geometric parameter is a chord distribution defined as chords as a function of a spanwise position along a span of the second vane, the chord distribution of the second vane different than that of the first vane such that the major portion of the leading edge of the second vane is circumferentially overlapped by the other one of the upstream stator vanes.

In another aspect, there is provided a stator assembly, comprising: an upstream stator having upstream stator vanes circumferentially distributed about a central axis; and a downstream stator having downstream stator vanes circumferentially distributed about the central axis, the downstream stator located downstream of the upstream stator, a number of the upstream stator vanes different than a number of the downstream stator vanes, the downstream stator vanes including: a first vane, a major portion of a leading edge of the first vane circumferentially overlapped by one of the upstream stator vanes; a second vane; and means for protecting the second vane of the downstream stator vanes against foreign object damage.

The stator assembly may include any of the following features, in any combinations.

In some embodiments, the means is a leading edge thickness of at least a section of the second vane visible via a spacing defined between two adjacent ones of the upstream stator vanes greater than that of the first vane.

In some embodiments, the section of the second vane includes at least 50% of a span of the second vane from a tip of the second vane.

In some embodiments, means are a sweep angle of the second vane differing than that of the first vane such that a major portion of a leading edge of the second vane is circumferentially overlapped by another one of the upstream stator vanes.

In some embodiments, the means are a stagger of the second vane different than that of the first vane such that a major portion of a leading edge of the second vane is circumferentially overlapped by another one of the upstream stator vanes, the stagger defined as an angle between an axial direction relative to the central axis and a line connecting the leading edge and a trailing edge of the second vane.

In some embodiments, the means are a camber of the second vane different than that of the first vane such that a major portion of the leading edge of the second vane is circumferentially overlapped by another one of the upstream stator vanes, the camber defined as a difference between a first angle defined between an axial direction relative to the central axis and a camber line at a leading edge of the second vane and a second angle defined between the axial direction and the camber line at a trailing edge of the second vane.

In some embodiments, the means are a curvature of a spanwise axis of the second vane different that that of the first vane such that a major portion of a leading edge of the second vane is circumferentially overlapped by another one of the upstream stator vanes.

In some embodiments, the means are a chord distribution of the second vane different than that of the first vane such that a major portion of a leading edge of the second vane is circumferentially overlapped by another one of the upstream stator vanes, the chord distribution defined as chords as a function of a spanwise position along a span of the second vane.

In yet another aspect, there is provided a method of manufacturing a downstream stator of a stator assembly, the stator assembly including an upstream stator and the downstream stator located downstream of the upstream stator, the method comprising: determining circumferential positions around a central axis of the stator assembly where vanes of the downstream stator are at least partially exposed between vanes of the upstream stator thereby susceptible to foreign object damage; installing a first vane of the downstream stator between two of the circumferential positions; and installing a second vane of the downstream stator at one of the circumferential positions, the second vane differing from the first vane by a geometric parameter causing the second vane to have one or more of: a stiffness greater than that of the first vane; and a major portion of a leading edge of the second vane overlapped by one of the vanes of the upstream stator.

BRIEF DESCRIPTION OF THE DRAWINGS

Reference is now made to the accompanying figures in which:

FIG. 3 is a schematic view illustrating vanes of the upstream stator and a first modified vane of the downstream stator in accordance with a first embodiment;

FIG. 4 is a cross-sectional view of a baseline vane of the downstream stator;

FIG. 5 is a cross-sectional view of the first modified vane;

FIG. 6 is a schematic view illustrating vanes of the upstream stator and a second modified vane of the downstream stator in accordance with a second embodiment;

FIG. 7 is a schematic view illustrating vanes of the upstream stator and a third modified vane of the downstream stator in accordance with a third embodiment;

FIG. 8 is a cross-sectional view of the baseline vane of the downstream stator;

FIG. 9 is a cross-sectional view of the third modified vane;

FIG. 10 is a schematic view illustrating vanes of the upstream stator and a fourth modified vane of the downstream stator in accordance with a fourth embodiment;

FIG. 11 is a cross-sectional view of the baseline vane of the downstream stator;

FIG. 12 is a cross-sectional view of the fourth modified vane;

FIG. 15 is a flowchart illustrating steps of a method of manufacturing the downstream stator.

DETAILED DESCRIPTION

Figure 1:
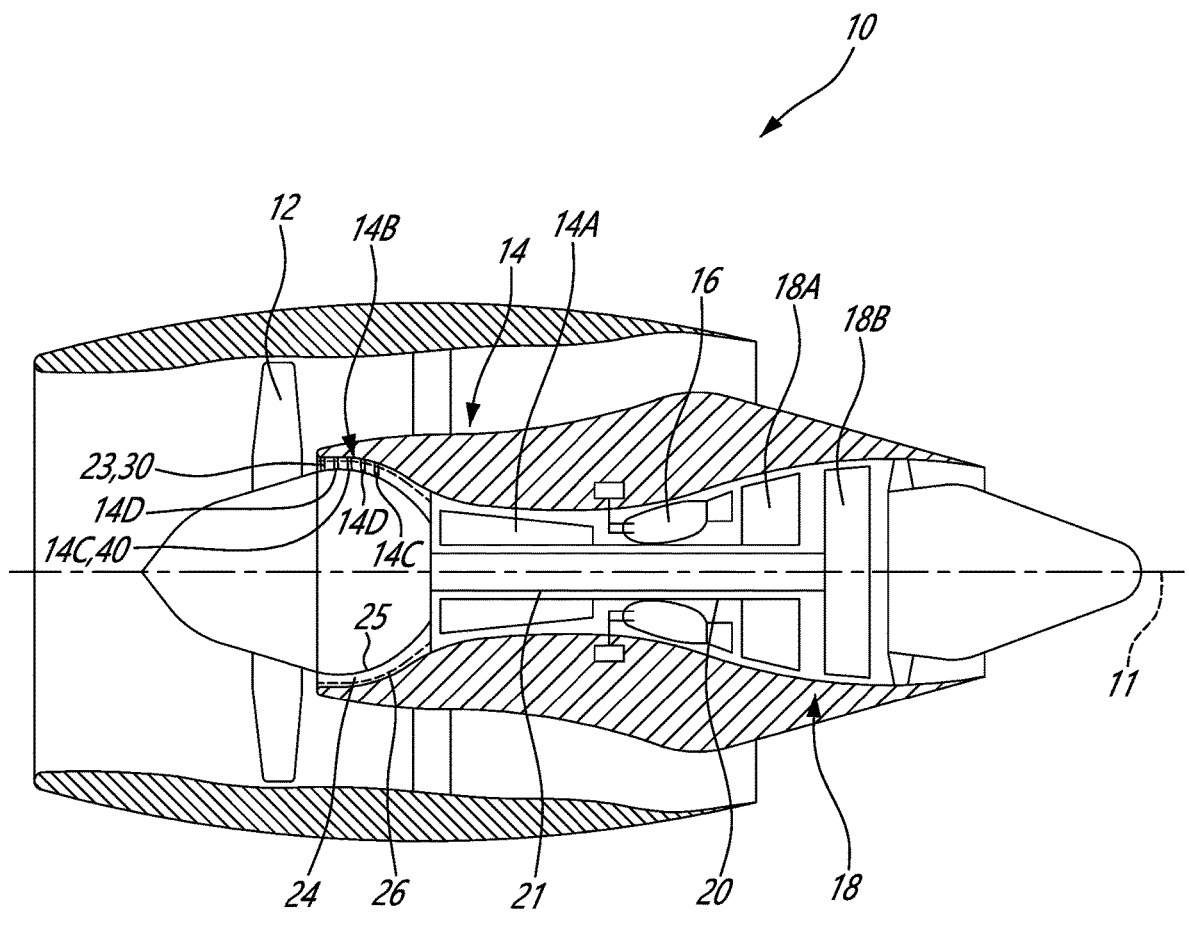
FIG. 1 is a schematic cross-sectional view of an aircraft engine depicted as a gas turbine engine.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10. In the embodiment shown, the gas turbine engine 10 comprises a high-pressure spool having a high-pressure shaft 20 drivingly engaging a high-pressure turbine 18A of the turbine section 18 to a high-pressure compressor 14A of the compressor section 14, and a low-pressure spool having a low-pressure shaft 21 drivingly engaging a low-pressure or power turbine 18B of the turbine section 18 to a low-pressure compressor 14B of the compressor section 14 and drivingly engaged to the fan 12. It will be understood that the contents of the present disclosure may be applicable to any suitable engines, such as turboprops and turboshafts. The engine may have one or more spools.

Still referring to FIG. 1, in the embodiment shown, a fan stator 23 is located within a core gaspath 24 of the gas turbine engine 10. The fan stator 23 is located downstream of the fan 12 relative to a flow within the core gaspath 24. The low-pressure compressor 14B, which may also be referred to as a boost compressor, includes successive rows of stators 14C and rotors 14D. A first rotor 14D of the low-pressure compressor 14B may be located downstream of the fan stator 23 and upstream of a first stator 14C of the low-pressure compressor 14B. The first stator 14C may be the first stator the flow within the core gaspath 24 meets after it leaves the fan stator 23. The fan stator 23 and the low-pressure compressor 14B are located within the core gaspath 24, which is defined between an inner wall 25 and an outer wall 26. This core gaspath 24 is located radially inwardly of an annular gaspath that extends around an engine core. Each of the core stator 23, and the rotors 14D and stators 14C include airfoils extending through the core gaspath 24.

For the remainder of the present disclosure, the fan stator 23 will be referred to as an upstream stator 30 and the first stator 14C of the low-pressure compressor 14B will be referred to as a downstream stator 40. It will be understood that the principles of the present disclosure may apply to any combinations of two stators in serial flow communication with each other. These two stators may be located at any suitable locations along the core gaspath 24, including but not limited to elsewhere within the compressor section 14 of the engine 10. Any pair of stators may benefit from the present disclosure.

Figure 2:
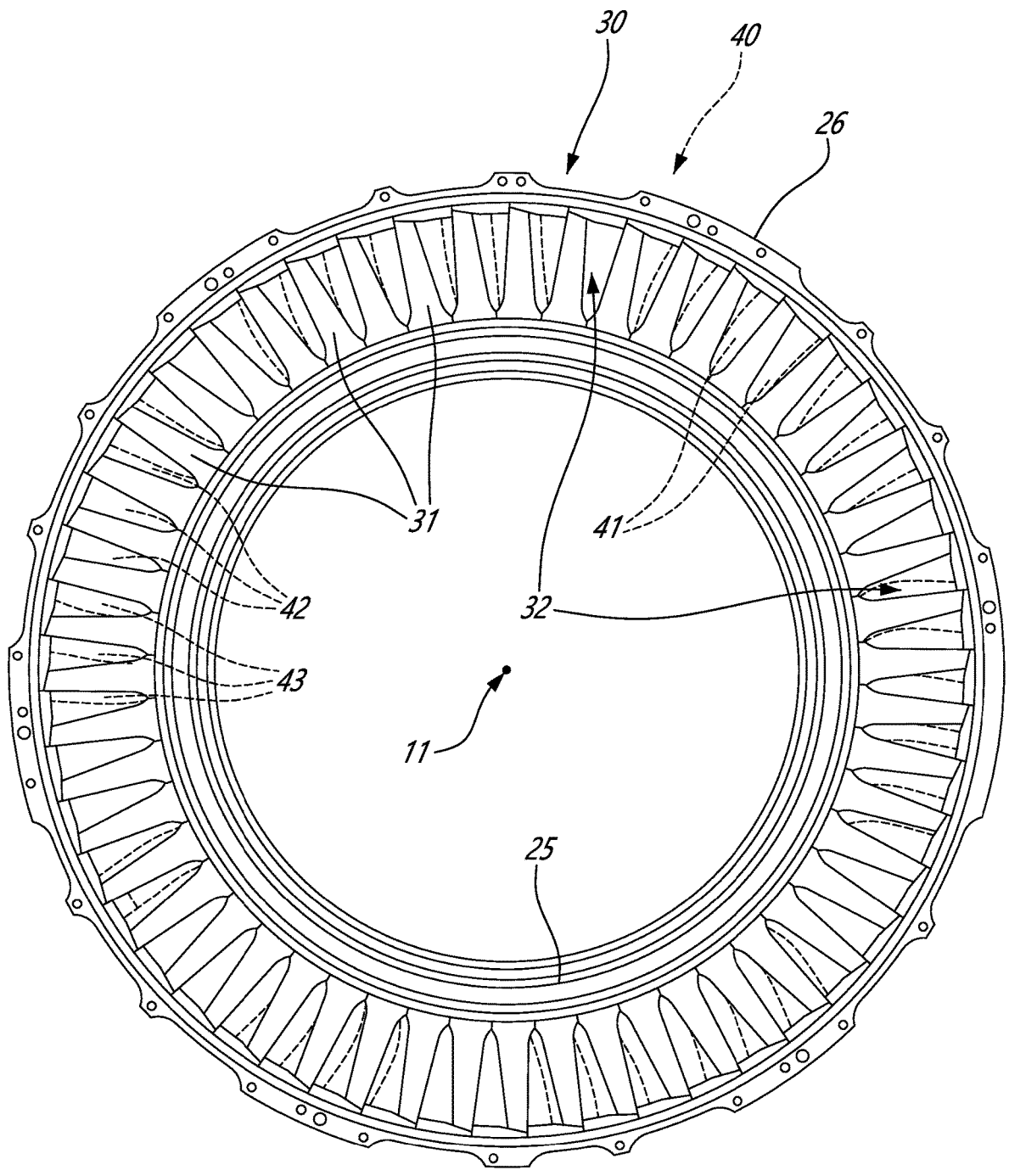
FIG. 2 is a front view of a stator assembly including an upstream stator and a downstream stator of the gas turbine engine of FIG. 1.

Referring now to FIG. 2, a front view of a section of the gas turbine engine 10 is presented and illustrates the upstream stator 30 in foreground and the downstream stator 40 in background. The upstream stator 30 includes upstream stator vanes 31 circumferentially distributed about the central axis 11. The upstream stator vanes 31 extend in a direction having a radial component relative to the central axis 11 from the inner wall 25 to the outer wall 26. The downstream stator 40 has downstream stator vanes 41 circumferentially distributed about the central axis 11. The downstream stator vanes 41 extend in a direction having a radial component relative to the central axis from the inner wall 25 to the outer wall 26. For the sake of clarity, in FIG. 2, outlines of the downstream stator vanes 41 are shown with dashed lines. The downstream stator 40 and its downstream stator vanes 41 are located rearward (i.e. relative to a direction of airflow therethrough) of the upstream stator 30 and the upstream stator vane 31. Thus, the airflow meets the upstream stator 30 before it meets the downstream stator 40.

In the present embodiment, the upstream stator vanes 31 are equidistantly separated form one another around the central axis 11. Similarly, the downstream stator vanes 41 are equidistantly separated from one another around the central axis 11. In other embodiments, distances between the upstream stator vanes 31 may vary. Distances between the downstream stator vanes 41 may vary. A number of the upstream stator vanes 31 may be different (e.g., more, less) than a number of the downstream stator vanes 41. A number of the downstream stator vanes 41 may not be a multiple of a number of the upstream stator vanes 31 and vice-versa. Consequently, some of the downstream stator vanes 41 may be visible via spacing 32 defined between circumferentially adjacent upstream stator vanes 31. As shown in FIG. 2, some of the downstream stator vanes 41 are visible through the upstream stator 30. In other words, some of the downstream stator vanes 41 have areas visible via the spacing 32 defined between the upstream stator vanes 31. Because of the different numbers in upstream stator vanes 31 and downstream stator vanes 41, some of the downstream stator vanes 41 may be more susceptible to foreign object damage (FOD) because sensitive sections of those downstream stator vanes 41 may become exposed to FOD via the spacing 32 between the upstream stator vanes 31. In FIG. 2, the downstream stator vanes 41 located at a plurality of circumferential positions, herein, at 1 o'clock, 3 o'clock, 5 o'clock, 7 o'clock, 9 o'clock, and 11 o'clock, may be most susceptible to FOD. Circumferential positions of the downstream stator vanes 41 susceptible to FOD may vary as a function of a number of the upstream stator vanes 31 and as a function of a number of the downstream stator vanes 41.

The sensitive areas of the downstream stator vanes 41 may correspond to leading edges of the downstream stator vanes 41. In some cases, the sensitive areas may correspond to the trailing edges. The thinner areas of the airfoils may correspond to the sensitive areas. More specifically, tip sections of the leading edges of the downstream stator vanes 41 may be particularly prone to FOD. Herein, the expression tip sections may include a radially-outer 50% of a span of the downstream stator vanes 41. In some cases, the tip sections includes a radially-outer 40%, or a radially-outer 30% in some cases, of the span. In some cases, the outer section of the span may include from 40% to 50% of the span. It may include all of the span in some cases. In some embodiments, base sections of the downstream stator vanes 41 may be the sensitive areas; the base sections extending from 0% to 50% span from the radially-inner ends. In some other cases, the tip sections includes a radially-outer 20% of the span. The tip sections of the leading edges of the downstream stator vanes 41 may be more sensitive to FOD because the downstream stator vanes 41 may decrease in both chord and thickness towards tips of the downstream stator vanes 41. This, in turn, may result in the tip sections of the downstream stator vanes 41 less stiff than a remainder of the downstream stator vanes 41 and, consequently, more susceptible to FOD. In some embodiments, the thickness distribution of the vane is constant along their spans. In the embodiment shown, the exposed part of the vanes is increasing from inner ends to outer ends. In this case, for the lower part, only small ice pellet may impact. For the higher part bigger ice pellets may impact. Small ice pellets may have less energy and may make less damage than bigger ice pellets closer to the tip. This may be engine-dependant. Some engine will fly at low speed and may be susceptible to FOD near the tip. Some other engine will fly much faster and may be susceptible to FOD closer to the radially inner ends of the vane. Small ice pellet at high speed might cause more damage than big pellets at low speed.

Still referring to FIG. 2, the downstream stator vanes 41 may be divided in two groups: a first group including first vanes and a second group include at least a second vane. Major portions of leading edges of the first vanes may be circumferentially overlapped by the upstream stator vanes 31. That is, the major portions of the leading edges of the first vanes may be not visible when looking in a direction parallel to the central axis 11 and parallel to a direction of an air flow flowing through the gas turbine engine 10. The first vanes may be substantially shielded or protected against FOD by the upstream stator vanes 31. In other words, major portions of the first vanes may not be visible via the spacing 32 defined between the upstream stator vanes 31. In some embodiments, major portions of leading edges of the first vanes may not be visible via the spacing 32 defined between the upstream stator vanes 31. Herein, the expression "major portions" may include 50% or more of a span starting from radially-outer ends. In some embodiments, major portions include 80%, 90%, or 100% of the span of the vane. In some embodiments, tip sections of the leading edges of the first vanes may not be visible via the spacing 32. The tip sections may include an outer 25% of the span of the vane. Since the first vanes of the downstream stator vanes 41 have their leading edges substantially overlapped, and thus covered, by the upstream stator vanes 31, they may be less susceptible of being impacted by a foreign object. The first vanes of the downstream stator vanes 41 are labelled with reference numeral 42 in FIG. 2. The at least second vane of the downstream stator vanes 41 is mostly exposed to FOD because major portions (e.g., 50% or more) of radially-outer sections of their leading edges is visible via the spacing 32 defined between the upstream stator vanes 31. The second vane of the downstream stator vanes 41 is labelled with reference numeral 43 in FIG. 2.

Still referring to FIG. 2, each of the downstream stator vanes 41 may be thin at its leading edge and increase to a maximum thickness along a chord before tapering back down towards its trailing edge. A downstream stator vane 41 may be considered at risk of FOD if the downstream stator vane 41 is exposed (e.g., visible within one of the spacing 32 between two upstream stator vanes 31) anywhere along the chord from its leading edge to a location of maximum thickness. In other words, the major portions of the leading edges may correspond to leading edge sections extending along chords of the downstream stator vanes 41 from the leading edges to locations of maximum thickness. The leading edge sections at spanwise locations closer to tips of the downstream stator vanes 41, for instance at the tip sections of the downstream stator vanes 41, may be more prone to FOD. Hence, the downstream stator vanes 41 having their leading edge sections along their tip sections (e.g., outer 25% of their span) exposed within the spacing 32 may be susceptible to FOD and may be considered a second vane 43.

Referring now to FIGS. 3-4, in the present embodiment, the second vane 43 differs from the first vanes 42 of the downstream stator vanes 41 by a geometric parameter. In the present embodiment, this difference in the geometric parameter is such that a stiffness of the second vane 43 of the downstream stator vanes 41 is greater than that of the first vanes 42. Thus, in this embodiment, exposure of radially-outer sections (e.g., outer 50%, outer 40%, outer 30%, outer 20%, outer 10%) of the leading edges of the downstream stator vanes 41 is unchanged, but they are made to be stiffer and, thus, may be more resistant to FOD.

Referring more particularly to FIG. 3, each of the upstream stator vanes 31 includes an airfoil having a leading edge 31A, a trailing edge 31B, a base 31C, and a tip 31D. Similarly, each of the downstream stator vanes 41 includes an airfoil having a leading edge 41A, a trailing edge 41B, a base 41C, and a tip 41D. The first vane 32 and the second vane 43 are illustrated in FIG. 3 in dashed lines. As shown, a portion of this second vane 43 is visible via the spacing 32 between the two upstream stator vanes 31 illustrated with solid lines. In the present case, a major portion, herein an entirety, of the leading edge 41A of the second vane 43 is visible via the spacing 32.

Referring now to FIG. 4, a cross-sectional view of one of the first vanes 42 is illustrated. The first vanes 42 have a first thickness distribution characterized by thicknesses as a function of a chordwise position along a chord C that corresponds to a straight line connecting the leading edge 41A to the trailing edge 41B. This thickness variation is characterized by a first maximum thickness T1. This first maximum thickness T1 corresponds to a maximal distance between a pressure side 41E of the downstream stator vanes 41 and a suction side 41F of the downstream stator vanes 41.

Referring now to FIG. 5, a cross-sectional view of the second vane 43 is illustrated. This vane is referred to below as a first modified vane 44. The downstream stator 40 may include one or more this first modified vane 44 at any of the circumferential positions associated with high risk of FOD. The first modified vane 44 has a second thickness distribution characterized by thicknesses as a function of a chordwise position along the chord C, which may be the same as the chord of the first vanes 42. This thickness variation is characterized by a second maximum thickness T2. The second maximum thickness T2 is greater than the first maximum thickness T1. In some embodiments, a ratio of the second maximum thickness to the first maximum thickness (T2/T1) may range from 0.2 to 2.0, in some cases from 0.1 to 1.0. By having a greater maximum thickness, the first modified vane 44 may have a greater stiffness than the first vanes 42. Thus, first modified vane 44 may be more resistant to FOD than first vanes 42 even if a major portion (e.g., 50% or more) of their leading edges 41A is exposed within the spacing 32 between eh upstream stator vanes 31.

In some embodiments, the thickness at the leading edge 41A of the vane is increased. The thickness at the trailing edge of the vane may be increased in some embodiments. Two vanes may have the same maximum thickness, but different leading edge thickness. In FIG. 5, the second vane 43 has a greater maximum thickness and a greater leading edge thickness than the first vane 42. A ratio of the leading edge thickness of the second vane 43 to the leading edge thickness of the first vane 42 may range from 0.2 to 2.0, and from 0.1 to 1.0 in some embodiments.

The first modified vane 44 may have the thickness distribution represented in FIG. 5 along an entirety of its span S. Alternatively, only a section (e.g., radially-outer section) of the first modified vane 44 susceptible to FOD may be modified to have the thickness distribution depicted in FIG. 5. A remainder of the downstream stator vanes 41 may have the same thickness distribution of the first vanes 42. In some embodiments, only a tip section 41G (FIG. 3) of the first modified vane 44 may exhibit the thickness distribution of FIG. 5. Consequently, areas of the first modified vane 44 most susceptible to FOD may be thicken to increase their stiffness so that they may be more resistant to FOD, and less prone to damage if impacted with a foreign object. In some embodiments, the second maximum thickness T2 of the first modified vane 44 may be the same as the first maximum thickness T1, but a thickness of the first modified vane 44 may be thicker than that of the first vanes 42 at at least one chordwise position. In other words, the first modified vane 44 may be made thicker overall without exceeding the first maximum thickness T1.

Many other modifications to the first modified vane 44 may be carried to at least partially protect them against FOD. Above, the first modified vane 44 is modified to be thicker and stiffer without changing how they are exposed to FOD via the spacing 32 between the upstream stator vanes 31. Below, modifications to the first modified vane 44 are described. These modifications are performed by changing one or more geometric parameter(s) of these vanes to increase a portion of their leading edges overlapped (e.g., protected, shielded) by the upstream stator vanes 31.

Referring now to FIG. 6, another embodiment of the second vane 43 is shown. This vane is referred to below as a second modified vane 144 and is shown in dashed lines in FIG. 6. The downstream stator 40 may include one or more of the second modified vane 144 at any of the circumferential positions associated with high risk of FOD. In the present embodiment, the second modified vane 144 differs from the first vanes 42 by its sweep angle μl. The sweep angle μl of the second modified vane 144 is greater than that of the first vanes 42 (shown in dashed line on the left). The sweep angle μl is defined as an angle between a quarter chord line Q of the second modified vane 144 and a radial direction relative to the central axis 11. In the present embodiment, the sweep angle μl is defined between the radially inner wall 25 and the quarter chord line Q.

As shown in FIG. 6, by increasing the sweep angle μl, a major portion (e.g., 50% or more) of a leading edge 144A of the second modified vane 144 becomes circumferentially overlapped by one of the upstream stator vanes 31. This may result in a radially-outer end 144B being circumferentially offset from a base or radially-inner end 144C. Consequently, because of this increased sweep angle μl compared to that of the first vanes 42, the major portion of the leading edge 144A of the second modified vane 144 of the downstream stator vanes 41 becomes circumferentially overlapped, and thus may become substantially protected or shielded, by one of the upstream stator vanes 31. In the embodiment shown, the major portion of the leading edge of the second modified vane 144 corresponds to a radially-outer section of the second modified vane 144. This radially-outer section may include more than 50% of a span of the second modified vane 144 from its radially-outer end 144B. In some embodiments, the sweep angle may be increase by 2 to 25 degrees.

In the embodiment depicted in FIG. 6, the sweep angle μl is negative in that the second modified vane 144 is swept in a downstream direction relative to the flow flowing within the core gaspath 24 (FIG. 1). In some other configurations, the sweep angle µ1 may be positive such that the second modified vane is swept in an upstream direction. This may be useful to decrease an exposure of a tip section of the second modified vane to the spacing 32 between the upstream stator vanes 31.

Referring now to FIGS. 7-9, another embodiment of the second vane 43 is shown. This vane is referred to below as a third modified vane 244. The downstream stator 40 may include one or more of the third modified vane 244 at any of the circumferential positions associated with high risk of FOD. In the present embodiment, the third modified vane 244 differs from the first vanes 42 by its stagger angle. The stagger angle is defined as an angle between an axial direction D1 relative to the central axis 11 and a line connecting a leading edge and a trailing edge. As illustrated in FIGS. 8-9, a first stagger angle S1 of the first vanes 42 is greater than a second stagger angle S2 than the third modified vane 244. In turn, this may result in a third projection P3 of the third modified vane 244 on a plane normal to the central axis 11 to be less than a first projection P1 of the first vanes 42 on the plane normal to the central axis 11. Therefore, an effective area of the third modified vane 244 may be less than that of the first vanes 42. As illustrated in FIG. 7, because of this difference in the stagger angles S1, S2, the third modified vane 244 may have an entirety of its leading edge 244A, or at least a major portion (e.g., outer 50% or more) thereof, circumferentially overlapped by one of the upstream stator vanes 31. The stagger angle of the third modified vane 244 may be such that a major portion of the leading edge 244A of the third modified vane 244 is circumferentially overlapped by one of the upstream stator vanes 31.

The major portion may be more than 50% of a span of the third modified vane 244. The major portion may be more than 50% of a radially-outer section of the leading edge 244A of the third modified vane 244. In some embodiments, the stagger angle S2 is selected such that not more than 25%-30% of an outer section of a span of the third modified vane 244 is visible via the spacing 32 between the upstream stator vanes 31. In some cases, the stagger angle S2 is selected such that an entirety of the leading edge of the third modified vane 244 is not visible via the spacing 32.

Referring now to FIGS. 10-12, another embodiment of the second vane 43 is shown. This vane is referred to below as a fourth modified vane 344. The downstream stator 40 may include one or more of the fourth modified vane 344 at any of the circumferential positions associated with high risk of FOD. In the present embodiment, the fourth modified vane 344 differs from the first vanes 42 by its camber. The camber is defined as a difference between a first angle defined between the axial direction D1 relative to the central axis 11 and a camber line at a leading edge 344A and a second angle defined between the axial direction D1 and the camber line at a trailing edge 344B. The camber line is a line that connects the leading edge 344A to the trailing edge 344B and that is located at a mid-thickness between pressure and suction sides 344C, 344D. In the embodiment shown, the fourth modified vane 344 has a greater camber than that of the first vanes 42. That is, a first difference between a first angle CA1 defined between the axial direction D1 and the camber line at the leading edge 41A of the first vanes 42 and a second angle CB1 defined between the axial direction D1 and the camber line at the trailing edge 41B of the first vanes 42 is different than a second difference between a first angle CA2 defined between the axial direction D1 and the camber line at the leading edge 344A of the fourth modified vane 43 and a second angle CB2 defined between the axial direction D1 and the camber line at the trailing edge 344B of the fourth modified vane 344. Herein, the second difference is greater than the first difference. The difference in camber may be at least 0.5 degree.

This difference in camber may result in a fourth projection P4 of the fourth modified vane 344 on a plane normal to the central axis 11 to be less than the first projection P1 of the first vanes 42 on the plane. Therefore, an effective area of the fourth modified vane 344 may be less than that of the first vanes 42. This change in the camber may result in an increase coverage of the fourth modified vane 344 by one of the upstream stator vanes 31.

By increasing the camber, a major portion (e.g., 50% or more) of the leading edge 344A of the fourth modified vane 344 becomes circumferentially overlapped by one of the upstream stator vanes 31. Because of this modification in the camber compared to that of the first vanes 42, the major portion of the leading edge 344A of the fourth modified vane 344 of the downstream stator vanes 41 becomes circumferentially overlapped, and thus may become substantially protected or shielded, by one of the upstream stator vanes 31. In the embodiment shown, the major portion of the leading edge corresponds to a radially-outer section of the fourth modified vane 344. This radially-outer section may include more than 50% of a span from its radially-outer end.

Figure 13:
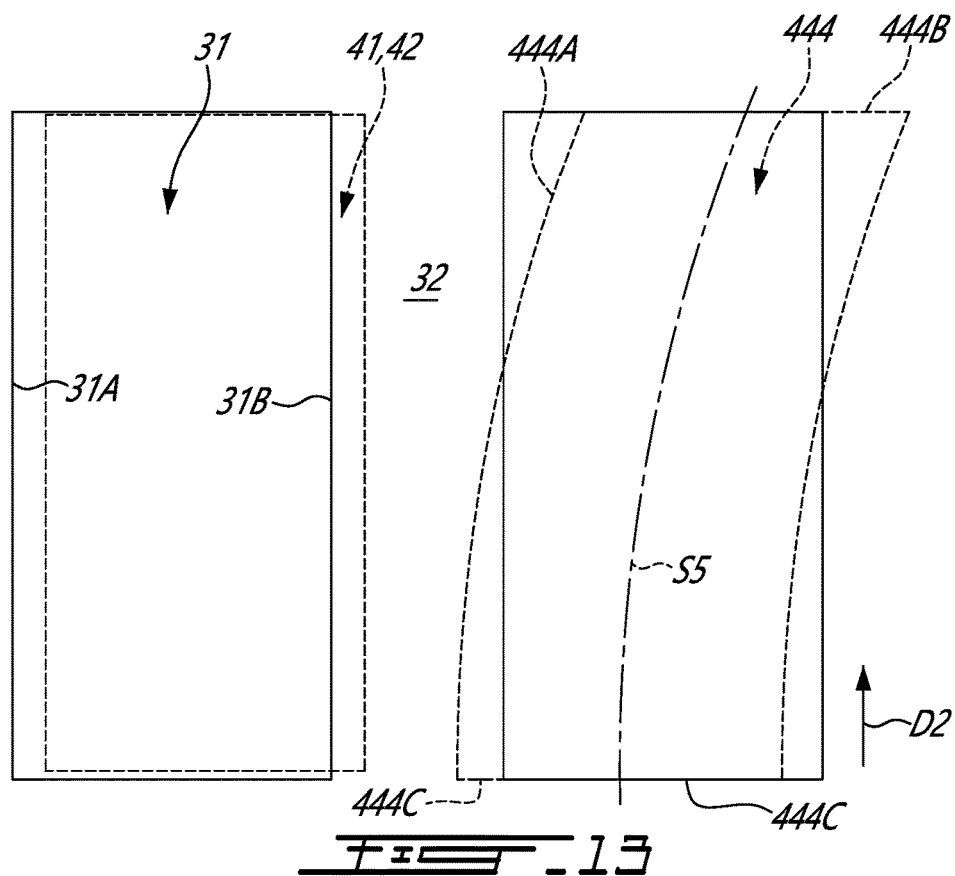
FIG. 13 is a schematic view illustrating vanes of the upstream stator and a fifth modified vane of the downstream stator in accordance with a fifth embodiment.

Referring now to FIGS. 13, another embodiment of the second vane 43 is shown. This vane is referred to below as a fifth modified vane 444. The downstream stator 40 may include one or more of the fifth modified vane 444 at any circumferential positions associated with high FOD risks. The fifth modified vane 444 may differ from the first vanes 42 by its curvature (i.e. bow). As illustrated on FIG. 13, the fifth modified vane 444 has a spanwise axis S5 that curves along a radial direction D2 relative to the central axis 11. This curvature of the spanwise axis S5 of the fifth modified vane 444 is such that a major portion of a leading edge 444A of the fifth modified vane 444 is circumferentially overlapped by the vane 31 of the upstream stator vanes. In other words, a tip or radially-outer end 444B of the fifth modified vane 444 is circumferentially offset from a base or radially-inner end 444C of the fifth modified vane 444.

By increasing the curvature as such, a major portion (e.g., 50% or more) of the leading edge 444A of the fifth modified vane 444 becomes circumferentially overlapped by one of the upstream stator vanes 31. This may result in the radially-outer end 444B being circumferentially offset from a base or radially-inner end 444C. Consequently, because of this increased curvature, the major portion of the leading edge 444A of the fifth modified vane 444 of the downstream stator vanes 41 becomes circumferentially overlapped, and thus may become substantially protected or shielded, by one of the upstream stator vanes 31. In the embodiment shown, the major portion of the leading edge 444A of the fifth modified vane 444 corresponds to a radially-outer section of the fifth modified vane 444. This radially-outer section may include more than 50% of a span of the fifth modified vane 444 from its radially-outer end 444B.

Figure 14:
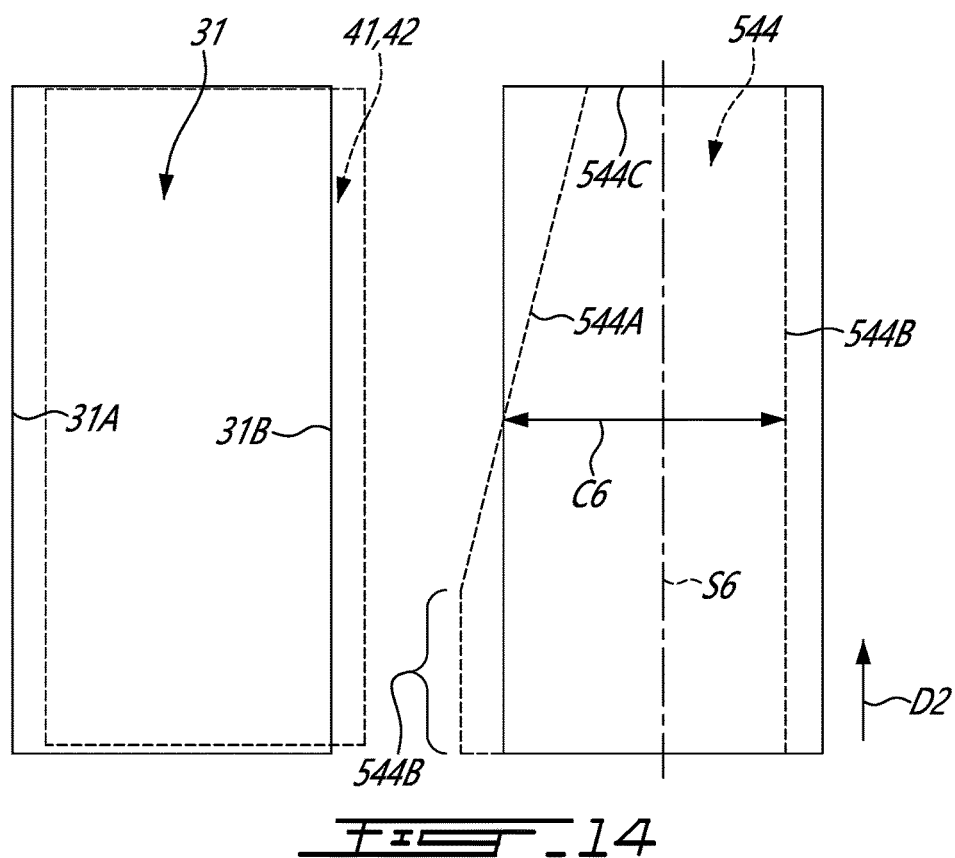
FIG. 14 is a schematic view illustrating vanes of the upstream stator and a sixth modified vane of the downstream stator in accordance with a sixth embodiment.

Referring now to FIG. 14, another embodiment of the second vane 43 is shown. This vane is referred to below as a sixth modified vane 544. The downstream stator 40 may include one or more of the sixth modified vane 544 at any circumferential positions associated with high FOD risks. The sixth modified vane 544 may differ from the first vanes 42 by its chord distribution. A chord distribution is defined as chords as a function of a spanwise position along a span S6 of the sixth modified vane 544. In the embodiment shown, the chord distribution of the sixth modified vane 544 differs from that of the first vanes 42 such that the major portion of a leading edge 544A of the sixth modified vane 544 is circumferentially overlapped by the vane 31 of the upstream stator vanes.

In the present embodiment, a base section 544B of the sixth modified vane 544 may remain substantially identical to base sections of the first vanes 42. The base section 544B may include, for instance, from about 0% to about 50% of the span S6, preferably from 5% to 20% of the span S6. A remainder of the span S6 of the sixth modified vane 544 may exhibit a decrease in its chord C6 from the base section 544B towards a tip or radially-outer end 544C of the sixth modified vane 544. Herein, the chord C6 decreases linearly from the base section 544B to the tip 544C. Alternatively, the chord C6 may decrease along any suitable function (e.g., quadratic, spline, etc).

By changing the chord distribution as depicted in FIG. 14, a major portion (e.g., 50% or more) of the leading edge 544A of the sixth modified vane 644 becomes circumferentially overlapped by one of the upstream stator vanes 31. Consequently, because of this change in chord distribution, the major portion of the leading edge 544A of the sixth modified vane 544 of the downstream stator vanes 41 becomes circumferentially overlapped, and thus may become substantially protected or shielded, by one of the upstream stator vanes 31. In the embodiment shown, the major portion of the leading edge of the sixth modified vane 644 corresponds to a radially-outer section of the sixth modified vane 644. This radially-outer section may include more than 50% of a span of the sixth modified vane 644 from its radially-outer end 544C.

Referring now to FIG. 15, a method of manufacturing the downstream stator 40 is shown at 1500. The method 1500 includes determining circumferential positions around the central axis 11 where downstream stator vanes 41 of the downstream stator 40 are susceptible to foreign object damage via spacing 32 defined between the vanes 31 of the upstream stator 30 at 1502; installing first vanes of the downstream stator 40 between the circumferential positions at 1504; and installing second vanes of the downstream stator 40 at the circumferential positions at 1506. The second vanes differing from the first vanes by a geometric parameter. The second vanes having one or more of a stiffness greater than that of the first vanes, and major portions of leading edges of the second vanes overlapped by the vanes of the upstream stator.

As explained herein above, the second vanes may differ from the first vanes by one or more of the thickness distribution, maximum thickness, sweep angle, stagger, camber, curvature, and chord distribution.

It will be appreciated that the second vane 43, 44, 144, 244, 344, 444, 544 may differ from the first vanes 42 by any combinations of the above-described geometric parameters. Any means used to protect the second vanes from FOD may be used. These means may include, for instance, thicker vanes, sweep angle, stagger angle, curvature, chord distribution, camber, and so on.

In some embodiments, the downstream stator 40 may be a segmented ring including a plurality of segments circumferentially distributed about the central axis. Each of the segments including at least one downstream stator vanes 41. Some of the segments may include the first vanes 42 whereas a remainder of the segments may include the second vanes 43, 44, 144, 244, 344, 444, 544. These segments including the second vanes 43, 44, 144, 244, 344, 444, 544 may be located at circumferential positions associated with high risks of FOD.

The present disclosure proposes modification to some of vanes of a downstream stator. These modifications may increase resistance of these vanes against FOD. Other vanes not susceptible to FOD may remain unchanged. Therefore, by modifying only the vanes susceptible to FOD, weight and/or costs savings may be achieved. The use of a mixed vane configuration in this application may prevent airfoil damage during FOD events. The mixed configuration may be ideal as operability and performance may be improved by this incorporation rather than having all airfoils meeting the requirements. The vanes may be made of aluminum, or any other suitable material for compressors such as titanium, steel, and so on.

The disclosed downstream stator may include a mix of two or more airfoils with different thickness distribution on stator assembly. Any stator assembly which has airfoils made with two or more different thickness profile. It may include a mix of a segment where minimum of two airfoils with same thickness is adjacent to a minimum of two airfoils with increased thickness. The thickness may be increased for the exposed airfoils versus the unexposed airfoils. Here, exposure may be determined as, in the front view, the downstream stator's leading edges are shielded by the upstream stators at certain circumferential locations. In general, the stator is thin at the leading edge, may increase to a maximum thickness along the chord, and then tapers back down at the trailing edge. For downstream stators, where the stator is exposed to impact anywhere along the chord from the leading edge to point of maximum thickness, it is considered "exposed". Where the stator from the leading edge to point of maximum thickness is hidden behind the upstream stators, it is considered "shielded". Exposure may be defined by weakest areas of the downstream stator.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:
    an upstream stator having upstream stator vanes circumferentially distributed about a central axis;
    a rotor rotatable about the central axis and located downstream of the upstream stator; and
    a downstream stator located downstream of the rotor and having downstream stator vanes circumferentially distributed about the central axis, the downstream stator located downstream of the upstream stator relative to an airflow flowing within a core gaspath of the aircraft engine, a number of the upstream stator vanes different than a number of the downstream stator vanes, trailing edges of the upstream stator vanes being axially spaced apart from trailing edges of the downstream stator vanes,
    the downstream stator vanes including:
        a first vane, a major portion of a leading edge of the first vane circumferentially overlapped by one of the upstream stator vanes, the first vane located at a first circumferential position relative to the central axis, the first circumferential position at least partially circumferentially registering with one of the upstream stator vanes; and a second vane at least partially exposed between vanes of the upstream stator and susceptible to foreign object damage, the second vane located at a second circumferential position relative to the central axis, the second circumferential position at least partially circumferentially registering with a space defined between two adjacent ones of the upstream stator vanes such that at least a portion of the second vane is visible through the space via a line of sight parallel to the central axis, the second vane differing from the first vane by a geometric parameter, the geometric parameter causing the second vane to have one or more of:
  a stiffness greater than that of the first vane, and
  a major portion of a leading edge of the second vane circumferentially overlapped by another one of the upstream stator vanes.

2. The aircraft engine of claim 1, wherein the major portion of the leading edge of the second vane includes at least 50% of a span of the second vane.

3. The aircraft engine of claim 2, wherein the major portion is a radially-outer portion of the second vane.

4. The aircraft engine of claim 1, wherein the stiffness of the second vane is greater than that of the first vanes.

5. The aircraft engine of claim 4, wherein a thickness distribution of the second vane is different that that of the first vanes.

6. The aircraft engine of claim 5, wherein a leading edge thickness of the second vane is greater than that of the first vane.

7. The aircraft engine of claim 1, wherein the geometric parameter is a sweep angle defined as an angle between a quarter chord line of the second vane and a radial direction relative to the central axis, the sweep angle of the second vane different than that of the first vane such that the major portion of the leading edge of the second vane is circumferentially overlapped by the other one of the upstream stator vanes.

8. The aircraft engine of claim 1, wherein the geometric parameter is a stagger defined as an angle between an axial direction relative to the central axis and a line connecting a leading edge and a trailing edge of the second vane, the stagger of the second vane different than that of the first vane such that the major portion of the leading edge of the second vane is circumferentially overlapped by the other one of the upstream stator vanes.

9. The aircraft engine of claim 1, wherein the geometric parameter is a camber defined as a difference between a first angle defined between an axial direction relative to the central axis and a camber line at a leading edge of the second vane and a second angle defined between the axial direction and the camber line at a trailing edge of the second vane, the camber of the second vane different than that of the first vane such that the major portion of the leading edge of the second vane is circumferentially overlapped by the other one of the upstream stator vanes.

10. The aircraft engine of claim 1, wherein the geometric parameter is a curvature of a spanwise axis of the second vane, the curvature of the second vane different than that of the first vane such that the major portion of the leading edge of the second vane is circumferentially overlapped by the other one of the upstream stator vanes.

11. The aircraft engine of claim 1, wherein the geometric parameter is a chord distribution defined as chords as a function of a spanwise position along a span of the second vane, the chord distribution of the second vane different than that of the first vane such that the major portion of the leading edge of the second vane is circumferentially overlapped by the other one of the upstream stator vanes.

* * * * *